US010179644B2

(12) United States Patent
Abarca Lopez et al.

(10) Patent No.: US 10,179,644 B2
(45) Date of Patent: Jan. 15, 2019

(54) METHOD FOR OPERATING A LANDING GEAR SYSTEM

(71) Applicants: AIRBUS OPERATIONS, S.L., Getafe (Madrid) (ES); AIRBUS OPERATIONS S.A.S., Getafe (Madrid) (ES); AIRBUS OPERATIONS LTD., Filton (Bristol) (GB)

(72) Inventors: Ramon Abarca Lopez, Getafe (ES); Marcus Barth, Getafe (ES); Norman Wood, Filton (GB)

(73) Assignees: AIRBUS OPERATIONS, S.L., Getafe (Madrid) (ES); AIRBUS OPERATIONS S.A.S., Getafe (Madrid) (ES); AIRBUS OPERATIONS LTD., Filton (Bristol) (GB)

( * ) Notice: Subject to any disclaimer, the term of this patent is extended or adjusted under 35 U.S.C. 154(b) by 170 days.

(21) Appl. No.: 15/183,428

(22) Filed: Jun. 15, 2016

(65) Prior Publication Data
US 2016/0362177 A1    Dec. 15, 2016

(30) Foreign Application Priority Data
Jun. 15, 2015    (EP) .................................... 15382312

(51) Int. Cl.
*B64C 25/18*    (2006.01)
*B64C 25/30*    (2006.01)
(Continued)

(52) U.S. Cl.
CPC .............. *B64C 25/18* (2013.01); *B64C 25/00* (2013.01); *B64C 25/04* (2013.01); *B64C 25/16* (2013.01);
(Continued)

(58) Field of Classification Search
CPC ......... B64C 25/18; B64C 25/16; B64C 25/30; B64C 25/08; B64C 25/10; B64C 25/12; B64C 2025/125
See application file for complete search history.

(56) References Cited

U.S. PATENT DOCUMENTS 6,311,927 B1 *  11/2001  Elving ................... B64C 25/22
                                               244/100 R
9,102,403 B2 *   8/2015  Filho ...................... B64C 25/30
                          (Continued)

FOREIGN PATENT DOCUMENTS

EP    2738089 A2    6/2014
EP    2878534 A1    6/2015

OTHER PUBLICATIONS

European Search Report, dated Oct. 29, 2015; Four (4) Pages.

*Primary Examiner* — Philip J Bonzell
(74) *Attorney, Agent, or Firm* — John S. Artz; Dickinson Wright PLLC

(57) ABSTRACT

The present disclosure refers to a method for operating a landing gear system, preferably in a tricycle configuration, wherein main landing gear (MLG) and the nose landing gear (NLG) are operable from a retracted position where they are housed respectively inside landing gear bays, to a fully extended position where they are extended for landing the aircraft. According to the disclosure, the extension of the nose landing gear (NLG) is delayed in time with respect to the extension of the main landing gear (MLG), and the nose landing gear (NLG) is kept retracted during a major part of the time that the main landing gear doors (MLGD) are extended. In this manner, vibrations on the main landing gear doors are reduced and incidents caused by fatigue are also reduced, which in turn implies that the maintenance cost of the aircraft is greatly reduced.

12 Claims, 4 Drawing Sheets

(51) Int. Cl.
 *B64C 25/04* (2006.01)
 *B64C 25/16* (2006.01)
 *B64C 25/00* (2006.01)

(52) U.S. Cl.
 CPC ........ *B64C 25/30* (2013.01); *B64C 2025/003* (2013.01)

(56) References Cited

U.S. PATENT DOCUMENTS

2009/0008501 A1\* 1/2009 Chow .................... B64C 25/16
 244/100 R
2013/0026291 A1 1/2013 Way \* cited by examiner

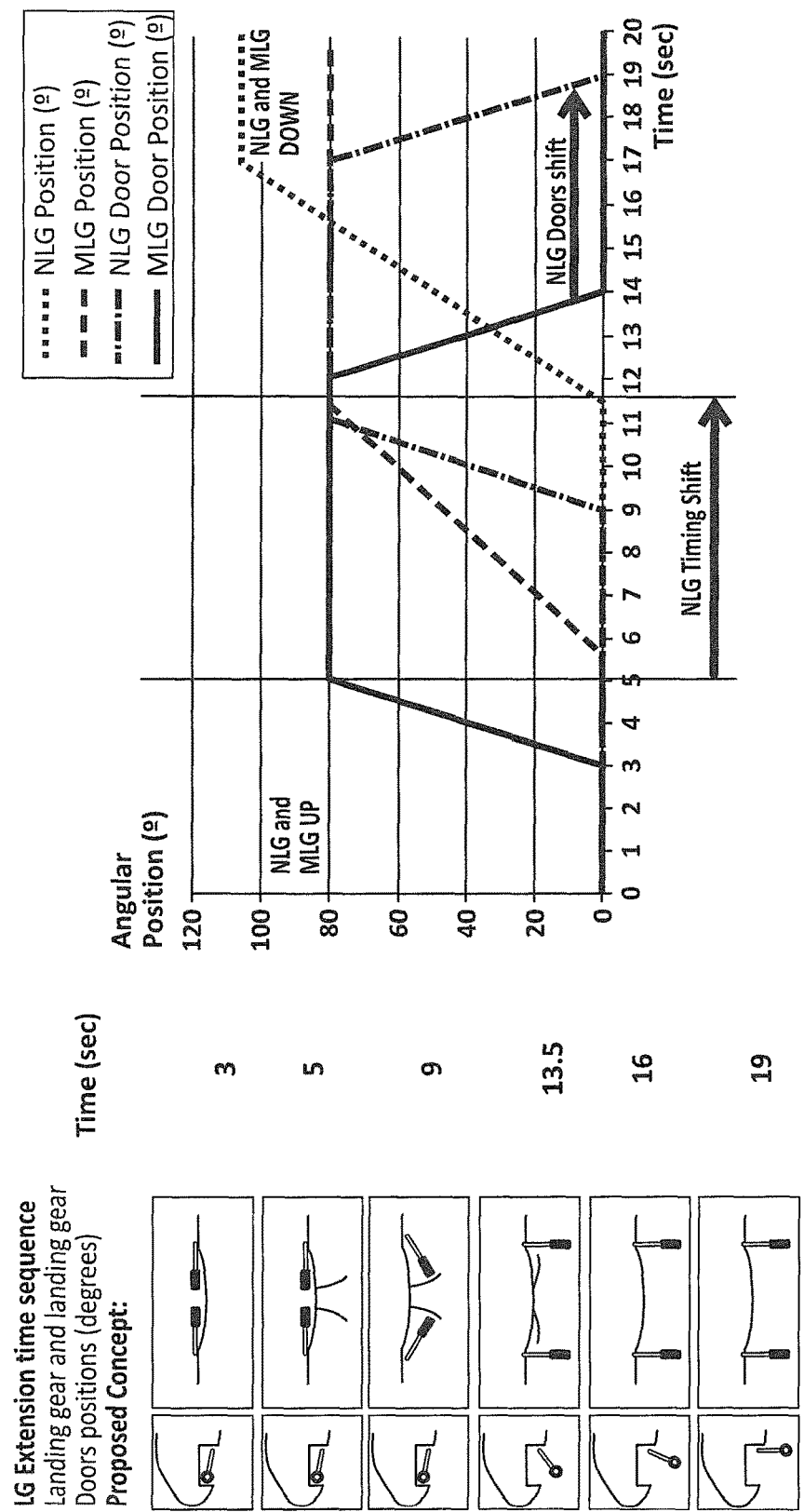

METHOD FOR OPERATING A LANDING GEAR SYSTEM

CROSS-REFERENCE TO RELATED APPLICATIONS

The present disclosure claims priority to European Application No. 15382312.5 filed on Jun. 15, 2015, which is hereby incorporated by reference, as though set forth fully herein.

FIELD OF DISCLOSURE

The present disclosure refers in general to aircraft landing gear systems, and more specifically, to a method for extending and/or retracting a landing gear.

An object of the present disclosure is to provide a method for operating a landing gear system, which reduces maintenance costs during an aircraft operational life, caused by fatigue damages in the main landing gear doors and ancillary components.

BACKGROUND OF THE DISCLOSURE

The most widespread landing gear configuration in jet aircrafts is the "tricycle" configuration, which consists of two sets of main landing gear (port and starboard), and one set of forward or nose landing gear. The main landing gear is fitted to the aircraft wing, and the nose landing gear is fitted to a forward fuselage section.

The main role of the main landing gear is to withstand the main loads transmitted between the ground and the aircraft during landing, whereas the main role of the nose landing gear is to provide an additional point of support for the aircraft, and to steer the aircraft on the ground during taxing.

Conventionally, aircrafts are equipped with a hydraulic system to operate the landing gear, such as to extend or lower the landing gears for landing operations, and to retract the landing gear into corresponding gear bays for flight.

Modern aircrafts also include gear doors for the main and nose landing gears, which closes the landing gear bays during flight and during part of the landing operation. When an aircraft is rolling for taking off, the gear doors are normally closed and remain in this position after liftoff. As soon as the aircraft reaches a positive rate of climb, the pilot activates the landing gear retraction, and then the landing gear doors are open for receiving the landing gear into the landing gear bays, and after that, the gear doors are closed for the flight.

The sequence traditionally used in prior art aircrafts for extending the landing gear for landings is illustrated in FIGS. 1A and 1B, whereas the landing gear retraction for take-offs is illustrated in FIGS. 3A and 3B. Landing gear extension begins with the opening of the gear doors to expose the gear bays. Once the gear doors reach their final extended position, the extension of the nose and main landing gears is started, such that both the nose and main lading gears are lowered at the same time, while the gear doors remain open. Once nose and main landing gears reach their final extended position, the gear doors are closed to cover the landing gear bays.

First, in the retraction sequence (FIGS. 3A and 3B), the nose and main landing gear doors are open, and after reaching their fully open position, nose and main landing gears are retracted substantially at the same time. Once nose and main landing gears reach their final retracted position within the respective landing gear bays, nose and main landing gear doors are closed at the same time.

It can be observed in FIGS. 1A, 1B, 3A, and 3B that during most of the extension/retraction operations, the nose and main landing gear doors are extended while the nose and main landing gear are being extended/retracted.

It has been demonstrated that in that condition, the main cause of vibrations of the main landing gear doors is the aerodynamic excitation generated by the nose landing gear wake, impacting on the main landing gear doors.

SUMMARY OF THE DISCLOSURE

The present disclosure avoids impacts on the main landing gear doors of the wake originated at the nose landing gear, by modifying the landing gear extension and/or retraction sequence in a way to significantly reduce the interface vibration loads of the Main Landing Gear Door (MLGD) attachments, with the purpose of enhancing fatigue life of the MLGD attachments, and to reduce the associated maintenance costs during aircraft operational life.

An aspect of the disclosure refers to a method for operating a landing gear system with a main landing gear arranged at a central section of an aircraft, for example two sets of landing gear symmetrically fitted to the aircraft wings, and a nose landing gear fitted to a forward section of the aircraft near its nose. Preferably, the method is implemented in an aircraft having a main landing gear and nose landing gear arranged to form together a tricycle landing gear configuration.

Conventionally, the main landing gear and the nose landing gear are operable reversely from a retracted position where they are housed inside corresponding landing gear bays, to an extended position where they are extended for landing and taxing the aircraft.

According to the method of the disclosure, the extension of the nose landing gear is delayed in time with respect to the extension of the main landing gear. That is, for extending the landing gear, first the extension of the main landing gear is started while the nose landing gear is kept retracted within a nose landing gear bay. For example, the extension of the nose landing gear is started once the main landing gear has reached their fully extended position or down position, and when the main landing gear doors are again closed or retracted (total decoupled movement).

Alternatively, the extension of the nose landing gear is started when the main landing gear doors, during their closing movement of the extension operation, reach a predefined angular position (partially decoupled movement).

Preferably, that predefined angular position of the main landing gear doors is less 50% of its fully extended position, and in a preferred aspect the predefined angular position is less than 10% of its fully extended position.

The extension sequence, according to the disclosure, implies that the extension of the nose landing gear (NLG) is started shortly before, shortly after, or at the same time as the beginning of the retraction of the MLGDs, in such a manner that the NLG is kept retracted during the major part of the time that the MLGDs are fully extended. The technical effect associated to this extension sequence is that the vibration levels on the MLGD, and especially, in the doors fittings caused by the NLG presence are significantly reduced, simply by eliminating the cause of the excitation.

Alternatively, the delayed extension of the nose landing gear may also refer to the nose landing gear's angular speed, such as extension of the nose and main landing gear is started approximately at the same time, but the nose landing gear is extended at a slower angular speed than the main landing gear, in order to obtain the previously mentioned effect.

In addition or alternatively, the disclosure also applies to the retraction operation, such that the retraction of the MLG is delayed in time with respect to the retraction of the NLG. The opposite procedure is performed for the retraction sequence in which the nose landing gear starts to retract first, while keeping the main landing gear extended and the main landing gear doors closed. Once the nose landing gear reaches, preferably, less than 10% of the fully retracted position, then the main landing gear doors start to being extended.

The retraction sequence, according to the disclosure, implies that the retraction of the NLG is finished shortly before, shortly after or at the same time that the beginning of the extension of the MLGDs.

Throughout the following disclosure, the term "gear doors" refers to the gear bay doors that serve to at least partially cover the gear bays after extension of the corresponding landing gear.

Simply by keeping the nose landing gear retracted, while the main landing gear doors are extended in flight, the vibration levels at the main landing gear doors are drastically reduced.

The solution introduced by the disclosure provides at least the followings advantages:

Increases component lifetime, thus reducing maintenance costs

It can be retrofitted to an existing aircraft fleet

It could potentially reduce aircraft noise.

Another aspect of the disclosure refers to the landing gear operation control system, which is configured to operate in two modes. In a first mode, the landing gear controls system operates the landing gear in a decoupling mode between the nose and main landing gear, as explained above with respect to the method of the disclosure, whereas in a second mode, the landing gear is operated with both nose and main landing gears at the same time (nominal mode). The mode can either be selected by the pilot (the first mode is for normal everyday operation, and the second mode is used under a failure scenario when it is necessary to operate the landing gear quickly, for example during a free fall wherein both landing gears are extended by gravity at the same time), based on speed (nominal operation below a certain threshold, decoupled mode above a threshold limit for which the target loads are exceeded under normal operation), or based on the type of landing gear movement (nominal operation for retraction in order to not penalize take-off performance, decoupled operation for extension which generally occurs at higher speeds).

BRIEF DESCRIPTION OF THE FIGURES

Preferred embodiments of the disclosure are henceforth described with reference to the accompanying drawings, in which:

FIG. 1A is a schematic representation of the traditional time sequence, where the nose landing gear is shown at the left side of the FIG. 1A in a side view, and the main landing gear is shown at the right side of FIG. 1A as a front view from the nose of the aircraft. FIG. 1B is a graph representing the angular position with respect of time, of the nose and main landing gears, and the angular position of the nose and main landing gear doors during an extension sequence according to the prior art and in correspondence with FIG. 1A;

FIGS. 2A and 2B are examples of an extending time sequence according to an aspect of the present disclosure, where the angular position 0° represents the fully retracted position of the respective landing gear and landing gear doors;

FIG. 3A shows a schematic representation of the traditional time sequence where the nose landing gear is shown at the left of FIG. 3A in a side view, and the main landing gear is shown at the right side of FIG. 3A as a front view from the nose of the aircraft. FIG. 3B is a graph representing the angular position with respect of time, of the nose and main landing gears, and the angular position of the nose and main landing gear doors during a retraction sequence according to the prior art and in correspondence with FIG. 3A.

DETAILED DESCRIPTION OF THE PRESENT DISCLOSURE

Figure 1B:
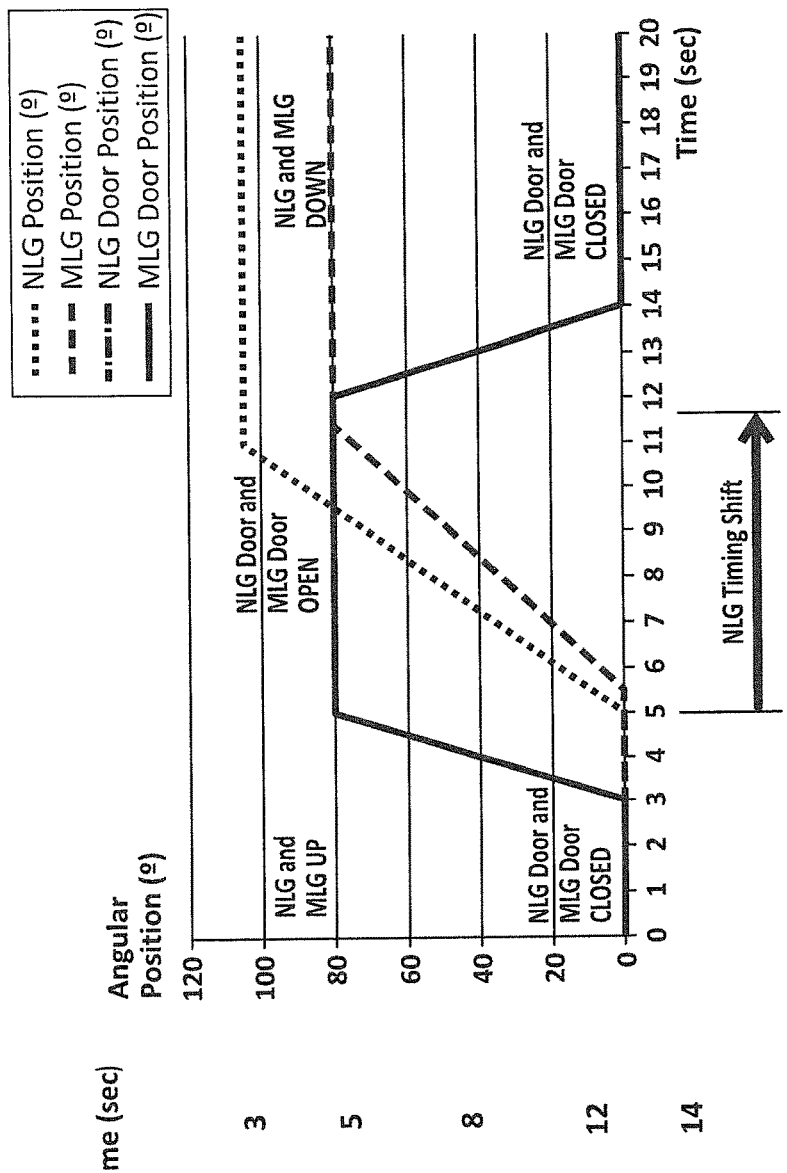
FIGS. 1A and 1B are illustrations representing the traditional time sequence for extending the nose and main landing gear and corresponding landing gear doors of an aircraft according to the prior art. In particular.
Figure 1A:
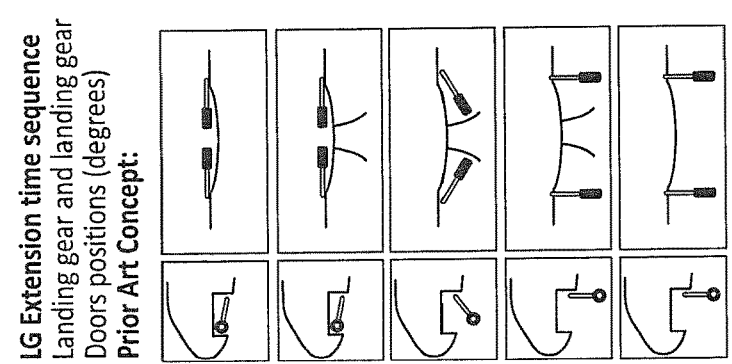
Figures 3A, 3B:
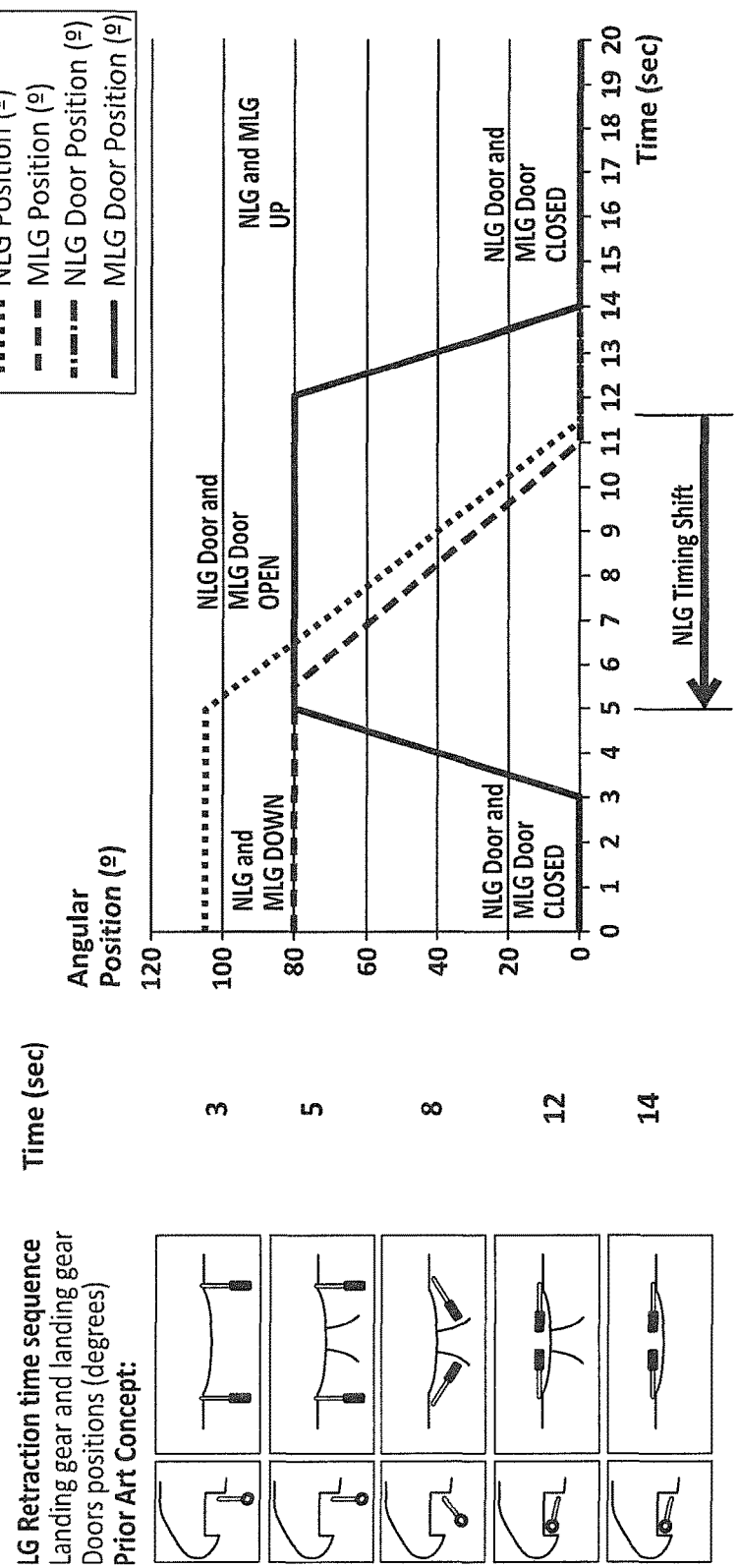
FIGS. 3A and 3B are illustrations representing the traditional time sequence for retracting the nose and main landing gear of an aircraft according to the prior art. In particular.

An exemplary embodiment of the method for operating a landing gear (LG) system according to the disclosure, and in particular for extending or lowering the landing gear, is represented in FIGS. 2A and 2B, which is shown in comparison with the prior art extension sequence (FIGS. 1A and 1B).

In the method of the disclosure, the sequence for extending the main landing gear (MLG) and the main landing gear doors (MLGD), is similar to the traditional sequence shown in FIGS. 1A and 1B. However, the extension of the nose landing gear (NLG) is delayed in time with respect to the extension of the MLG.

As shown in the example in FIG. 2B, a few seconds after the pilot activates the extension sequence, the extension of the MLGD is initiated and the fully extended position of the same is reached approximately in two seconds. Once the MLGD reach their final extended position, the extension of the MLG is started and approximately in six seconds, the MLG reaches its final or fully extended position. Once the MLG is fully extended, the main landing gear bays have to be closed again, and for that the MLGD are retracted.

According to the disclosure, the extension of the NLG is delayed in time with respect to the extension of the MLG, in the case of FIG. 2B, this delay is represented as the time frame ((NLG) Timing Shift). This means that the extension of the NLG in FIG. 2B is started after the beginning of the extension of the NLG of FIG. 1B, for example the extension of the NLG is started after the MLG reach their fully extended position (80° in FIG. 2B), and before or after starting the retraction of the MLGDs.

This time delay ((NLG) Time Shift) with respect to the extension of the MLG is represented in FIGS. 1B and 2B in combination, and it can be adjusted, that is, it can be made shorter or longer for each particular application (aircraft type), in order to be compatible with the acceptable load levels for new aircraft designs or for retrofit solutions, taking into account the landing gear timing and the aircraft performance requirements.

In a preferred embodiment, the extension of the NLG is coordinated with the extension of the MLGD, such as the extension position of the NLG is less than 50% of its fully extended position, when the MLGDs start their closing movement.

In another preferred embodiment, the extension of the NLG is coordinated with the extension of the MLGD, such that the extension position of the nose landing gear is less than 10% of its fully extended position, when the MLGDs starts their closing movement.

In another preferred embodiments, depending on the size or type of the aircraft, the extension of the NLG is started when the MLG has reached at least less than 50% of its fully extended position.

Figures 4A, 4B:
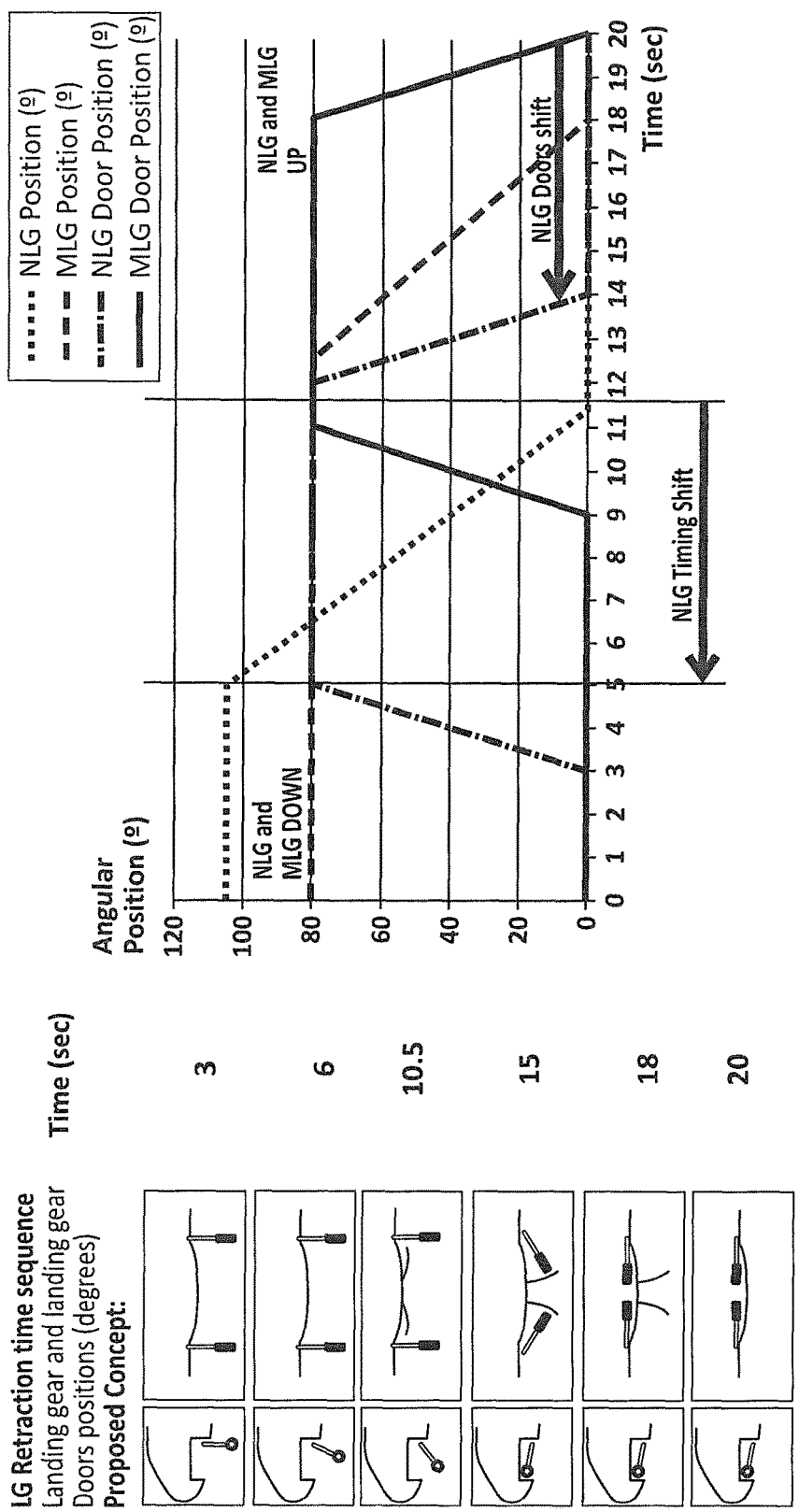
FIGS. 4A and 4B are examples of a retracting sequence according to an aspect of the present disclosure, where the angular position 0° represents the fully retracted position of the respective landing gear and landing gear doors.

The retraction time sequence is shown in FIGS. 4A and 4B, and follows an inverse sequence as the one described above for the extension time sequence. Nose and main landing gears (NLG,MLG) are in their extended position, and nose and main landing gear doors (NLGD,MLGD) are in their retracted position. Once retraction of the landing gear is ordered by the pilot few seconds after take-off, first the NLGD is opened and after that, the NLG is extended, while main landing gear and main landing gear doors remains in the same position.

Once the NLG has reached a predetermined angular position in its retraction movement, or when the NLG has reached its fully retracted position, then extension of the MLGDs is started.

Therefore, the operation of the NLG is coordinated with the operation of the MLGD, such that the NLG is kept retracted (housed within a nose landing gear bay) during a major part of the time that the MLGDs are fully extended, either for the extension and for the retraction operation, wherein the major part of the time means more than 50% of the time. For example 80% or 90% of the time. In this manner, vibrations on the main landing gear doors are reduced with yields on great reduction on maintenance costs.

Preferably, the method of the disclosure is applied only during normal flight conditions (without emergency); however, during emergency procedures the traditional extension operation described with respect to FIG. 1B is applied.

The method of the disclosure can be retrofitted in existing aircrafts or forward fitted in future aircraft, by modifying the control program of the landing gear actuation hydraulic system.

An additional advantage of the disclosure is that the MLG can be lowered earlier in order to have the LG drags acting more time to slow down the aircraft since the vibrations on the MLGD are now reduced, which is beneficial in a normal landing approach.

Other preferred embodiments of the present disclosure are described in the appended dependent claims and the multiple combinations of those claims.

What is claimed:

1. A method for operating a landing gear system for an aircraft, the landing gear system having a main landing gear arranged at a central section of an aircraft, a nose landing gear arranged at a forward section of the aircraft, and main landing gear doors, comprising:
   operating the main landing gear and the nose landing gear from a retracted position where the main landing gear and the nose landing gear are housed inside respective landing gear bays, to a fully extended position where the main landing gear and the nose landing gear are deployed for landing the aircraft;
   operating the main landing gear doors from a retracted position to a fully extended position, and
   delaying, in time, at least one of the extension of the nose landing gear with respect to the extension of the main landing gear, and the retraction of the main landing gear with respect to the retraction of the nose landing gear.

2. The method according to claim 1, wherein the extension of the nose landing gear is started after the beginning of the extension of the main landing gear.

3. The method according to claim 2, wherein the extension of the nose landing gear is started once the main landing gear has reached the fully extended position.

4. The method according to claim 2, wherein the main landing gear doors are retracted after the main landing gear has reached the fully extended position, and wherein the extension of the nose landing gear is started before the beginning of that retraction of the main landing gear doors.

5. The method according to claim 2, wherein the main landing gear doors are retracted after the main landing gear has reached the fully extended position, and wherein extension of the nose landing gear is started after the beginning of the retraction of the main landing gear doors.

6. The method according to claim 2, wherein the extension of the nose landing gear is coordinated with the extension of the main landing gear doors, such that the extension of the nose landing gear is less than 50% of the fully extended position, when the main landing gear doors start a closing movement.

7. The method according to claim 2, wherein the extension of the nose landing gear is coordinated with the extension of the main landing gear doors, such that the extension of the nose landing gear is less than 10% of the fully extended position, when the main landing gear doors start a closing movement.

8. The method according to claim 1, wherein extension of the nose and main landing gear is started at the same time, but the nose landing gear is extended at a slower angular speed than the main landing gear, thereby delaying in time the extension of the nose landing gear with respect to extension of the main landing gear.

9. The method according to claim 1, wherein retraction of the nose landing gear is started while the main landing gear doors are kept in a retracted position.

10. The method according to claim 9, wherein during the retraction operation, once the nose landing gear has reached less than 10% of the fully extended position, the extension of the main landing gear doors is started.

11. The method according to claim 1, wherein the operation of the landing gears includes two modes of operation with an associated control system, wherein one mode is for normal operation with delayed operation between the nose landing gear and the main landing gear and the other mode is for abnormal operation in which all landing gear falls by gravity in case of emergency.

12. A method for operating a landing gear system for an aircraft, the landing gear system having a main landing gear arranged at a central section of an aircraft, a nose landing gear arranged at a forward section of the aircraft, and main landing gear doors, comprising:
   operating the main landing gear and the nose landing gear from a retracted position where the main landing gear and the nose landing gear are housed inside respective landing gear bays, to a fully extended position where the main landing gear and the nose landing gear are deployed for landing the aircraft;
   operating the main landing gear doors from a retracted position to a fully extended position, and delaying, in time, at least one of the extension of the nose landing gear with respect to the extension of the main landing gear, and the retraction of the main landing gear with respect to the retraction of the nose landing gear,
wherein the main landing gear and the nose landing gear are arranged to form together a tricycle landing gear configuration.

* * * * *